(12) United States Patent
Shaw et al.

(10) Patent No.: US 8,221,238 B1
(45) Date of Patent: Jul. 17, 2012

(54) DETERMINATION OF A REPUTATION OF AN ON-LINE GAME PLAYER

(75) Inventors: David Shaw, North Bend, WA (US); Patrick W. O'Kelley, II, Seattle, WA (US); William B. Fulton, Seattle, WA (US); Johan Peter Hansen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1342 days.

(21) Appl. No.: 11/313,103

(22) Filed: Dec. 20, 2005

Related U.S. Application Data

(63) Continuation-in-part of application No. 11/110,017, filed on Apr. 19, 2005.

(51) Int. Cl.
G06F 17/00 (2006.01)

(52) U.S. Cl. ............... 463/42; 463/29; 463/40; 463/41

(58) Field of Classification Search ............ 463/40–42, 463/29
See application file for complete search history.

(56) References Cited

U.S. PATENT DOCUMENTS

| | | | |
|---|---|---|---|
| 5,586,257 A | 12/1996 | Perlman | |
| 5,813,913 A | 9/1998 | Berner et al. | |
| 6,106,399 A | 8/2000 | Baker et al. | |
| 6,128,660 A | 10/2000 | Grimm et al. | |
| 6,322,451 B1 | 11/2001 | Miura | |
| 6,352,479 B1 | 3/2002 | Sparks, II | |
| 6,425,828 B2 | 7/2002 | Walker et al. | |
| 6,460,036 B1 * | 10/2002 | Herz | ........... 1/1 |
| 6,487,583 B1 | 11/2002 | Harvey et al. | |
| 6,641,481 B1 | 11/2003 | Mai et al. | |
| 6,648,760 B1 | 11/2003 | Nicastro | |
| 6,817,947 B2 | 11/2004 | Tanskanen | |
| 6,821,205 B2 | 11/2004 | Takahashi et al. | |
| 7,029,394 B2 | 4/2006 | Leen et al. | |
| 7,056,217 B1 | 6/2006 | Pelkey et al. | |
| 7,069,308 B2 | 6/2006 | Abrams | |
| 7,086,946 B2 | 8/2006 | Yoshida | |
| 7,530,895 B2 | 5/2009 | Kigoshi | |
| 7,614,955 B2 | 11/2009 | Farnham et al. | |

(Continued)

FOREIGN PATENT DOCUMENTS

JP 2002-032319 A 1/2002

(Continued)

OTHER PUBLICATIONS

Li Xiong and Ling Liu, "A Reputation-Based Trust Model for Peer-to-Peer eCommerce Communities", 2003.*

(Continued)

*Primary Examiner* — Ronald Laneau
*Assistant Examiner* — Justin Myhr
(74) *Attorney, Agent, or Firm* — Woodcock Washburn LLP

(57) ABSTRACT

A reputation of an on-line gamer is calculated in accordance with feedback about the gamer provided by other players. The gamer's reputation is determined in accordance with the number of players the gamer has encountered via game play, the number of players who have indicated that they prefer to play with the gamer again, and the number of players who have indicated that they prefer not to play with the gamer again. Parameters used to determine the gamer's reputation can be weighted and/or decayed to allow a more dynamic and temporally accurate determination of the gamer's reputation. Players can observe other players' reputations.

17 Claims, 16 Drawing Sheets

U.S. PATENT DOCUMENTS

| | | | |
|---|---|---|---|
| 2001/0004609 A1 | 6/2001 | Walker et al. | |
| 2001/0044339 A1 | 11/2001 | Cordero et al. | |
| 2002/0147645 A1 | 10/2002 | Alao et al. | |
| 2003/0064807 A1 | 4/2003 | Walker et al. | |
| 2003/0093168 A1 | 5/2003 | Nagaoka | |
| 2003/0126613 A1* | 7/2003 | McGuire | 725/109 |
| 2003/0216183 A1 | 11/2003 | Danieli et al. | |
| 2003/0216962 A1 | 11/2003 | Heller et al. | |
| 2003/0237087 A1 | 12/2003 | Kurapati et al. | |
| 2004/0097287 A1 | 5/2004 | Postrel | |
| 2004/0143852 A1 | 7/2004 | Meyers | |
| 2004/0192440 A1 | 9/2004 | Evans et al. | |
| 2005/0021750 A1 | 1/2005 | Abrams | |
| 2005/0181877 A1 | 8/2005 | Kuwahara et al. | |
| 2005/0192097 A1* | 9/2005 | Farnham et al. | 463/42 |
| 2005/0209002 A1 | 9/2005 | Blythe et al. | |
| 2005/0251399 A1* | 11/2005 | Agarwal et al. | 705/1 |
| 2006/0073882 A1* | 4/2006 | Rozkin et al. | 463/25 |
| 2006/0121990 A1 | 6/2006 | O'Kelley et al. | |
| 2006/0135264 A1 | 6/2006 | Shaw et al. | |
| 2006/0247055 A1 | 11/2006 | O'Kelley et al. | |
| 2006/0287096 A1 | 12/2006 | O'Kelley et al. | |
| 2006/0287099 A1 | 12/2006 | Shaw et al. | |

FOREIGN PATENT DOCUMENTS

| | | | |
|---|---|---|---|
| JP | 2002-177640 A | 6/2002 | |
| JP | 2003-281142 A | 10/2003 | |
| JP | 2003-340161 A | 12/2003 | |
| JP | 2004-062865 A | 2/2004 | |
| JP | 2004-329914 | 11/2004 | |
| KR | 2001-0091478 A | 10/2001 | |
| KR | 2002-0090910 | 12/2002 | |
| RU | 2102790 C1 | 1/1998 | |
| WO | WO 2006/113809 | 10/2006 | |
| WO | WO 2007/001628 | 1/2007 | |

OTHER PUBLICATIONS

Carrie Heeter, Ph.D., "BattleTech Masters: Emergence of the First U.S. Virtual Reality SubCulture", Jan. 1993, <http://gel.msu.edu/carrie/publications/battletechmasters.html>.*

"Feedback Forum" from eBay, Feb. 2, 2004, <http://web.archive.org/web/20040202054149/http://pages.ebay.com/services/forum/feedback.html>.

"Social Matching of Game Players On-Line", Specification, Application Number Not Yet Assigned.

"On-Line Gaming Session and Party Management", Specification, Application Number Not Yet Assigned.

Microsoft Case Study, "Innovative online gameplay community serves up 4 million pages per day", http://tech.msn.com/guides/1199615.armx, 2005, pp. 1-7.

"Quake," Wikipedia, The Free Encyclopedia, Feb. 22, 2009, <http://en.wikipedia.org/w/index.php?title=Client-side_Quake&oldid=272432231>.

"Client-side Prediction," Wikipedia, The Free Encyclopedia, Feb. 3, 2009, <http://en.wikipedia.org/w/index.php?title=Client-side_prediction&oldid=268359201>.

"Unreal Networking Architecture," Epic MegaGames, Inc., Jul. 21, 1999, <http://unreal.epicgames.com/network.htm>.

United States Patent and Trademark Office: Non-Final Office Action dated Oct. 1, 2008, U.S. Appl. No. 11/007,893.

United States Patent and Trademark Office: Restriction Requirement dated Oct. 7, 2009, U.S. Appl. No. 11/312,781.

United States Patent and Trademark Office: Non-Final Office Action dated Apr. 28, 2009, U.S. Appl. No. 11/110,017.

United States Patent and Trademark Office: Final Office Action dated Oct. 27, 2009, U.S. Appl. No. 11/110,017.

United States Patent and Trademark Office: Notice of Allowance dated Dec. 3, 2009, U.S. Appl. No. 11/007,893.

United States Patent and Trademark Office: Non-Final Office Action dated Nov. 1, 2007, U.S. Appl. No. 11/156,877.

United States Patent and Trademark Office: Final Office Action dated Jul. 9, 2008, U.S. Appl. No. 11/156,877.

United States Patent and Trademark Office: Non-Final Office Action dated Mar. 9, 2009, U.S. Appl. No. 11/156,877.

United States Patent and Trademark Office: Final Office Action dated Nov. 6, 2008, U.S. Appl. No. 11/156,877.

United States Patent and Trademark Office: Non-Final Office Action dated Dec. 11, 2007, U.S. Appl. No. 11/312,959.

United States Patent and Trademark Office: Final Office Action dated Sep. 30, 2008, U.S. Appl. No. 11/312,959.

United States Patent and Trademark Office: Non-Final Office Action dated May 27, 2009, U.S. Appl. No. 11/312,959.

United States Patent and Trademark Office: Final Office Action dated Feb. 2, 2010, U.S. Appl. No. 11/312,959.

PCT International Preliminary Report on Patentability issued Oct. 23, 2007, in corresponding International Application No. PCT/US2006/014750.

PCT International Search Report mailed Sep. 27, 2007, in corresponding International Application No. PCT/US2006/014750.

Supplementary European Search Report dated Dec. 3, 2008, in corresponding EP Application No. EP06750723.6.

PCT International Preliminary Report on Patentability issued Dec. 24, 2007, in corresponding International Application No. PCT/US2006/017307.

PCT International Search Report mailed Jul. 30, 2007, in corresponding International Application No. PCT/US2006/017307.

"Terra Nova: Reputation", Tera Nova Blog, http://terranova,blogs,comlterra_noval2003/12/reputation,html, accessed Apr. 6, 2010, 41 pages.

EP Application No. 06750723.6: Extended European Search Report, Dec. 3, 2008, 5 pages.

* cited by examiner

_US 8,221,238 B1_

DETERMINATION OF A REPUTATION OF AN ON-LINE GAME PLAYER

CROSS-REFERENCE TO RELATED APPLICATIONS

This application is a continuation-in-part of U.S. patent application Ser. No. 11/110,017, filed Apr. 19, 2005, titled "SYSTEM AND METHOD FOR PROVIDING FEEDBACK ON GAME PLAYERS AND ENHANCING SOCIAL MATCHMAKING," the disclosure of which is hereby incorporated by reference in its entirety.

TECHNICAL FIELD

The technical field generally relates to the field of gaming and multimedia devices, and more specifically is directed to providing information to a service regarding player behavior in an on-line gaming environment.

BACKGROUND

In online gaming, game hosting services and game developers have created a number of ways to track and personalize the online gaming experience. One drawback of existing systems is that many of the features have grown up independent of each other. Games send blobs of data about garners back and forth to a central service, but the service has no way to understand and aggregate the data outside of the game context. Games can host their own Websites, but the data displayed there is not universally accessible to other games.

In a sense, then, the service and games offer two parallel communities that offer great—but separated—resources for garners. First, in the game community, while playing a game, the gamer can see the community of others who play the specific game, the leaderboards for that game, and his personal achievements in that game. A game can tell a gamer, from the Service data, if a Friend is online, but it can't tell the gamer what, exactly that Friend is doing on the Service or when he will be available.

Second, in the service community, the service knows a game player's history, all of the games he's played, the amount of time he spends online, the size of his Friends list and all of the games that Friends have played or are playing, the Friends invites sent and received, the Messages sent and received, and all of the Feedback the gamer has given and received.

Systems have tried to leverage these on-line communities to match various players to allow them to play multi-player games. Nevertheless, in general such systems, which typically emphasize skill or experience in a single game or small family of games, do not group players who are likely to enjoy shared interaction based on social and/or personal considerations. That's because these social factors, which depend on large aggregates of data across many game types and session, cannot easily be taken into account when matching players for a single game. Matchmaking systems in the gaming world do not produce close relationships between individual players.

Further, players have been known to artificially distort information collected by a system pertaining to the a players skills and/or social interactions. For example, a player may be able to provide artificially positive or negative feedback about other players. This form of cheating can render player rankings unreliable.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

A reputation of an on-line gamer is determined in accordance with feedback about the gamer provided by other players. The feedback is indicative of positive and negative experiences with a particular gamer and expectations about appropriate conduct and type of game being played before a player joins the game session. The gamer's reputation is determined in accordance with the number of players the gamer has encountered via game play, the number of players who have indicated that they prefer to play with the gamer again, and the number of players who have indicated that they prefer not to play with the gamer again. In one embodiment, the gamer's reputation is determined, in part, by dividing the number of players that have provided negative feedback about the gamer by the number of players the gamer has encountered via game play. In another embodiment, the number of players that have indicated that they prefer not to play with the gamer again is subtracted from the numerator of the above ratio. In various embodiments, parameters used to determine the gamer's reputation are weighted and/or decayed to allow a more dynamic and temporally accurate determination of the gamer's reputation. Players can observe players' reputations.

A database having a plurality of user profiles is maintained by a service. The user profiles comprise a plurality of attributes of a plurality of users (or game players). The service is capable of receiving input from a select one of the plurality of users. The input is feedback about the reputation of other ones of the plurality of users. The service then maintains an aggregation of feedback for the plurality of users and an indication of the aggregation is capable of being read by the other of the plurality of users. The aggregation can be aggregated over a plurality of different games titles from variety of different game developers and distributors. The indication of feedback can comprise an indication of the number of positive or negative reviews that a player received. In that way, users of the system can quickly assess the reputation of a game player in the broader gaming community.

The service can also maintain selected ones of the plurality of users in an affiliate list for the select one of said plurality of users when that user provides positive or negative feedback. The affiliate list stores the relational information between each pair of users who have given positive or negative feedback on each other. The service is preferably maintained on a server and the plurality of users connects to the service over a network connection. More preferably, the plurality of users connects to the server by way of a game console. And the game console can locally execute at least a portion of the multi-player game. In the matchmaking of players for multi-player games, the service uses the affiliate list to prefer to put together players who have given positive feedback on each other. Additionally, in the matchmaking of players for multi-player games the service uses the affiliate list to avoid putting together players where one or both has given negative feedback on the other.

BRIEF DESCRIPTION OF THE DRAWINGS

The foregoing summary, as well as the following detailed description of reputation determination, is better understood when read in conjunction with the appended drawings. For the purpose of illustrating reputation determination, there are shown in the drawings exemplary constructions thereof; however, the determination of an on-line game player's reputation is not limited to the specific methods and instrumentalities disclosed. In the drawings.

DETAILED DESCRIPTION OF ILLUSTRATIVE EMBODIMENTS

Figure 1:
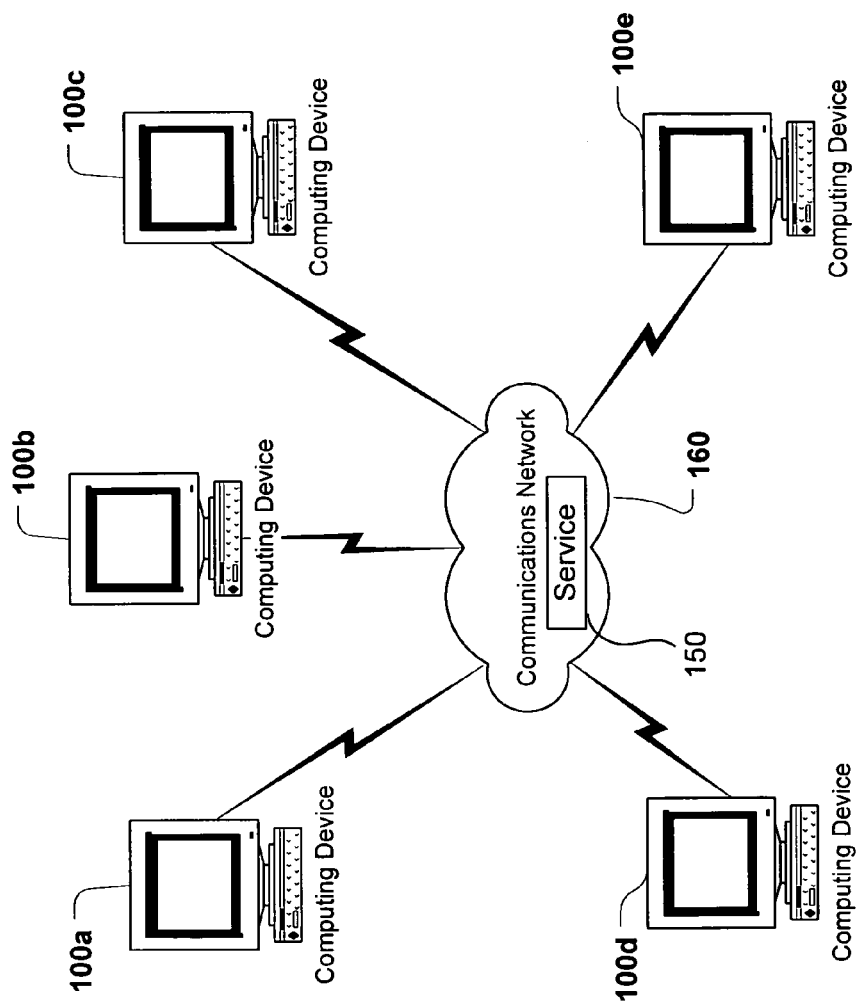
FIG. 1 is a block diagram of an exemplary computer network environment in which aspects of reputation determination can be implemented.

FIG. 1 is diagram of an exemplary computer network that serves to illustrate aspects of reputation determination of an on-line game player. Here computers 100a-100e can host various ones of the computing objects such as games and other applications. Although the physical environment shows the connected devices as computers, such illustration is merely exemplary and can comprise various digital devices such as PDAs, game consoles, etc. Moreover, communications network 160 can itself comprise a number of computers, servers and network devices such as routers and the like.

There is a variety of systems, components, and network configurations that support distributed computing environments. For example, computing systems can be connected together by wireline or wireless systems, by local networks or widely distributed networks. Currently, many of the networks are coupled to the Internet which provides the infrastructure for widely distributed computing and encompasses many different networks. Aspects of reputation determination of an on-line game player could be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process can be active in a first computer system, and the server process can be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server can be coupled to one another via TCP/IP connections for high-capacity communication.

In general, the computer network can comprise both server devices and client devices deployed in a network environment (in a peer-to-peer environment devices can be both clients and servers). Communications network 160 can be a LAN, WAN, intranet or the Internet, or a combination of any of these that facilitates communication among a number of computing devices 10a-10e. Moreover, communication network 160 can comprise wireless, wireline, or combination wireless and wireline connections. Additionally, the computer network can comprise a distributed computing environment. In such an environment a computing task can be spread over a number of computing devices that are addressable elements in a computer network.

According to an aspect of reputation determination, communication network 160 can host a service 150 that is accessible from the plurality of computers 100a-100e. The service 150 gathers information and tracks users of computers 100a-100e to provide computing services for all of the users of the service.

Figure 2:
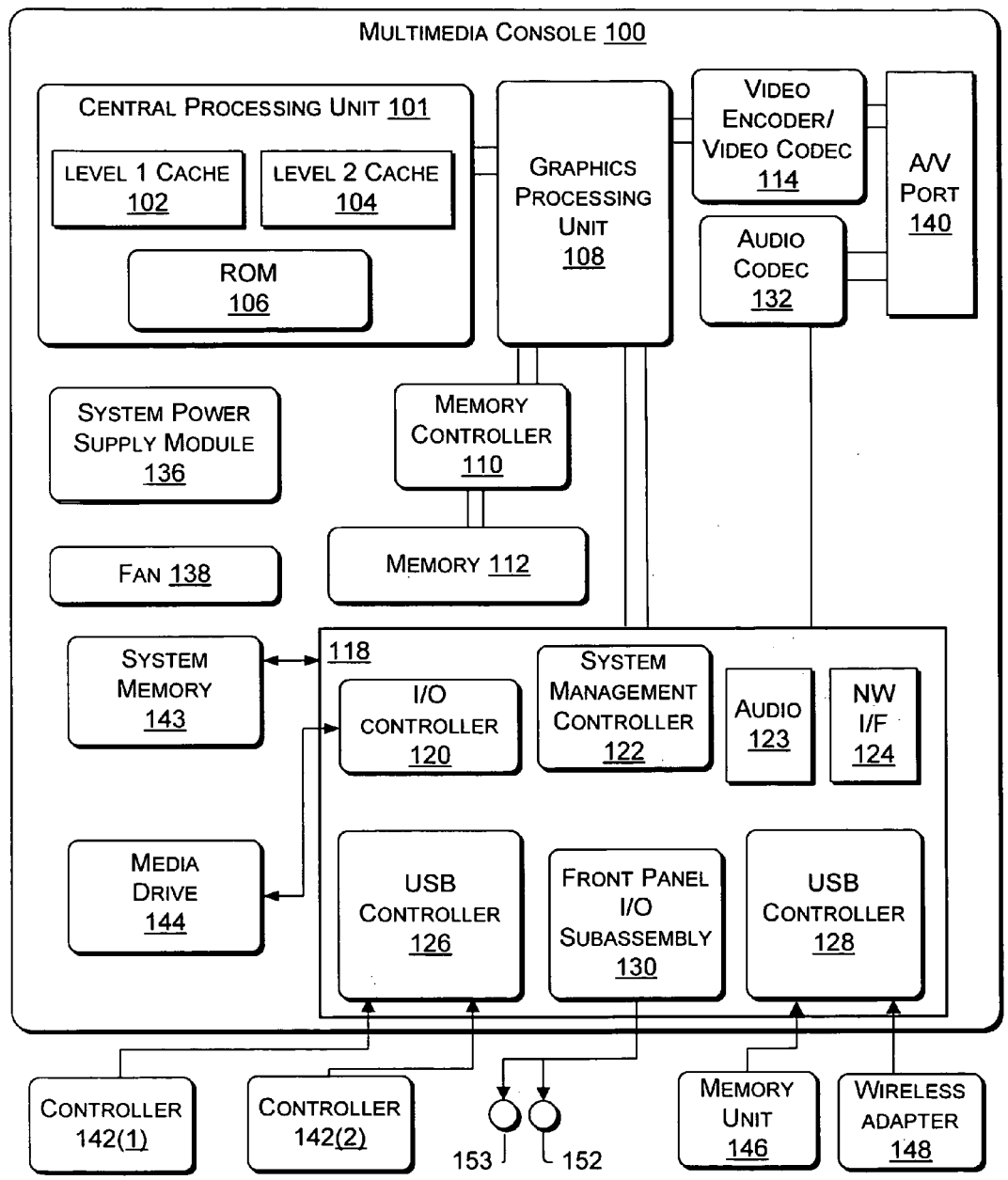
FIG. 2 is a block diagram illustrating an exemplary console that can be incorporated into a network computing environment such as the network computing environment of FIG. 1.

FIG. 2 illustrates the functional components of a multimedia/gaming console 100 that can be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 can be provided having more than one core, and thus, additional level 1 and level 2 caches 102 and 104. The flash ROM 106 can store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and can be any of a wide variety of various wired or wireless adapter components including an Ethernet card, a modem, a Bluetooth module, a cable modem, and the like.

System memory 143 is provided to store application data that is loaded during the boot process. A media drive 144 is provided and can comprise a DVD/CD drive, hard drive, or other removable media drive, etc. The media drive 144 can be internal or external to the multimedia console 100. Application data can be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 153 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data can be loaded from the system memory 143 into memory 112 and/or caches 102, 104 and executed on the CPU 101. The application can present a graphical user interface that provides a consistent user experience when navigating to different media types available on the multimedia console 100. In operation, applications and/or other media contained within the media drive 144 can be launched or played from the media drive 144 to provide additional functionalities to the multimedia console 100.

The multimedia console 100 can be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 can further be operated as a participant in the larger network community as illustrated in FIG. 1.

According to an aspect of reputation determination, when a game is executed on console 100, it provides information to a service operating on communications network 160. The service tracks the information for all of the users connected to the service to provide a rich user experience. The service tracks user information across games, consoles, computing devices, etc. By tracking the information for all users of the service, the service can aggregate statistics for all users and measure game playing ability, provide a richer user experience by providing information about friends (e.g., what game they are playing and what skill level they have attained), track user achievements and generally measure statistics for a game aggregated over a large user community.

For each user, the service will collect a number of pieces of data (called Profile Data) to build the user profile in every game session—and even after a game session is concluded. In general, the pieces of the service experience that feed profile include:

1. What the user says about himself or herself (including account set up and the construction of an elaborate personal profile, including the preferred social gameplay "zone").
2. What others say about the user (feedback scores that feed a publicly visible reputation).
3. What the games say about the user (game configuration and integration of data that comes out of game play to compute a player's skill, among other things).
4. What the system says about the user (time online, aggregates of games played, Friends list, console behavior etc.)

The system creates a "User Profile," which serves as a building block for services and applications that aim to create a social community of gamers and grow relationships among players. The User Profile is the entirety of information (e.g., metadata) related to a specific user (i.e., the game player's digital identity). The User Profile is developed from a set of services that collect and expose this information in a meaningful way to the community. The User Profile also provides for personalization such that users can customize and enhance their gaming experience. As will be discussed in greater detail below, the User Profile consists of various components, including, but not limited to, a Gamercard, game achievements, and gamer preferences.

Figure 3:
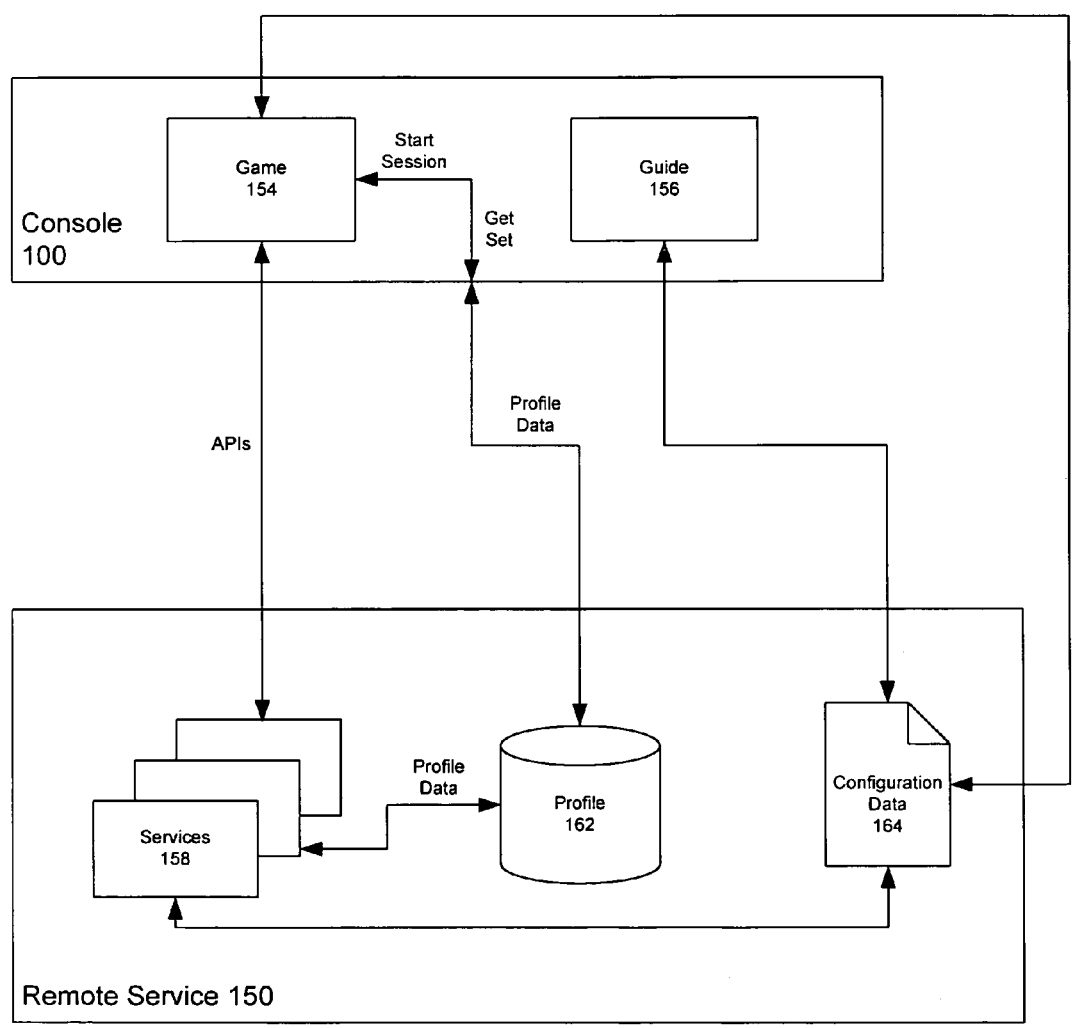
FIG. 3 is a block diagram illustrating the interaction of a console with the remote service.

Referring to FIG. 3, there is illustrated an overview of an exemplary architecture that can be used to implement the User Profile interaction as well as user interaction with the matchmaking service described more fully herein. The console 100 interacts with a remote service 150 that provides services 158 such as voice/chat, a friends list, matchmaking, content download, roaming, feedback, tournaments, voice messaging, and updates to gamers. The service 150 also maintains the User Profiles in a profile database 162 and configuration data 164 used by the services 158 and games 154. The service 150 collects User Profiles, aggregates, processes information supplied by other services 158, and fulfills real-time client requests for retrieving User Profile-related services. The User Profiles in the database 162 are also used by the games 154 to enable, among other things, personalization and customization, etc.

Using the console 100, the user can interact with a guide 156: The guide 156 provides an interface where the user can navigate to, and enter, various online areas and options provided by the service 158. When requesting User Profile information, the game 154 can pass a unique identifier of a user. The service 150 can return a Gamercard (discussed below), game stats, game achievements, affiliations, game settings. etc. Additional details of the various aspects of the exemplary architecture are provided below.

Figure 4:
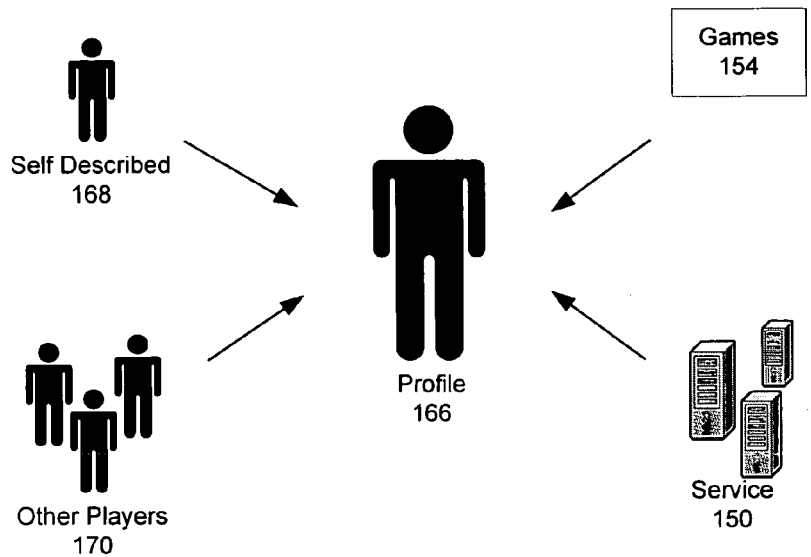
FIG. 4 illustrates the information gathered to build a user profile.

Referring to FIG. 4, the User Profile 166 is created when a user creates a profile (selected from the guide 156) and chooses his/her unique Gamertag (a user's unique name), tile (picture/avatar associated with the user) other options during an account sign-up phase. From there, a base User Profile 166 is created. The User Profile 166 can then be populated from several sources. For example, the User Profile 166 can include self-described data 168 from the User Profile owner. Other gamers 170 can provide feedback regarding the User Profile owner. The service 150 can track the user's online and offline activity. In addition, the games 154 can report the user's statistics and game achievements.

The owner of User Profile 166 can edit his/her User Profile 166 directly and control who can view each section of the User Profile. The User Profile 166 can be edited via general fields (e.g., tile, country, language, gender, greeting, etc.) and/or system settings (e.g., voice output, controller vibration, character name, game format, game mode, etc.). Privacy/Opt-out Settings can be tuned for the User Profile 166 to, e.g., restrict presence information only to friends, allow game achievements to be visible to all, etc.

The User Profile 166 can include feedback provided by other players 170. Feedback helps others learn about a particular gamer. For example, if the gamer uses foul language or aggressive play in game sessions, other gamers can submit feedback to the service 150. The feedback mechanism improves the user experience by building reputations. Players are therefore anonymous (known only by "Gamertag"), but not unknown because of the accumulated feedback.

In another aspect of the system, the service 150 and games 154 track online and offline activity of users to provide usage statistics in the Gamer Profile 166. When a gamer plays online, a particular game title is added to list of games played that is made visible to others. While offline, the game console 100 and game 154 track the user's activity via a mechanism for instrumenting games to collect detailed information about a specific player's in-game statistics and accomplishments. The Gamer Profile 166 is updated during the next connection to the service 150 to reflect the offline play. Game achievements can be reported to the service 154 by games via the User Profile data mechanism.

Figure 5:
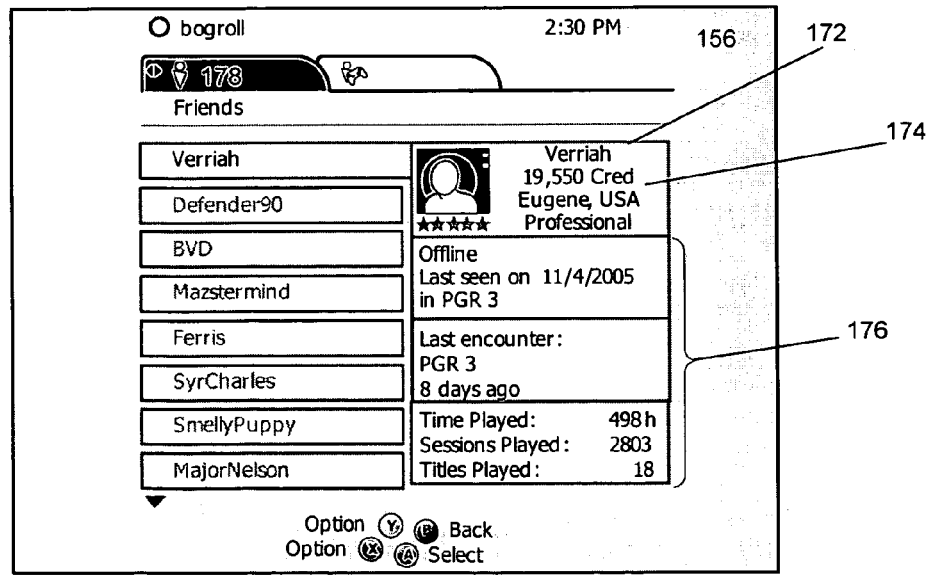
FIGS. 5-7 are example illustrations of a user interface displaying user profile information.
Figure 6:
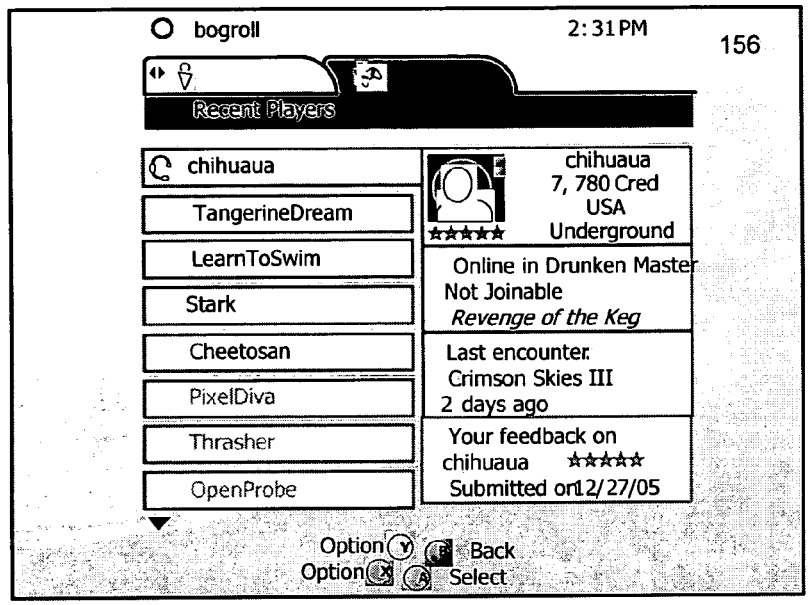
Figure 7:
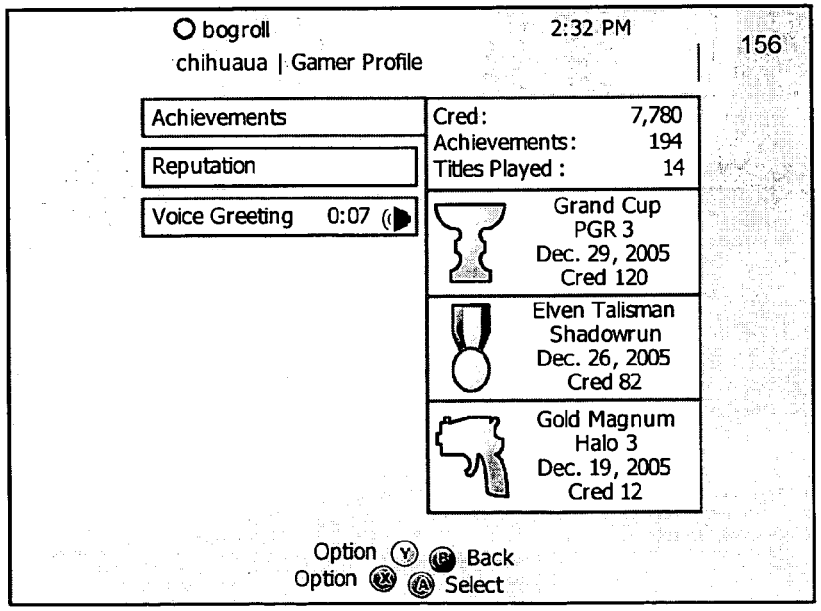

Referring to FIGS. 5-7, the Gamer Profile can be viewed in a number of ways and forms, and is typically displayed in the Gamercard 172. The Gamercard 172 is the visual representation of the Gamer Profile 166 that is available to games on the console 100 and, e.g., the web. The Gamercard 172 serves as a summary or snapshot of a player's Gamer Profile 166.

As shown in FIG. 5, the Gamercard 172 can be divided into two regions, a base area 174 and a context-specific (or extended) area 176. The base area 174 is provides a set of Gamer Profile information in a standard and consistent way across multiple contexts, whereas the extended area 176 can be customized to fit a specific context. Although the Gamercard 172 of FIGS. 5-8 are shown in the context of the guide 156, the Gamercard 172 can be visually separated from the rest of the screen and adopt the background color of the screen it is displayed on. In addition, the Gamercard 172 can be temporarily replaced by an animation while it is being loaded for viewing.

The base area 174 can be provided in different variants corresponding to differing contexts, while being a consistent view within each context. For example, an online Gamercard 172 is shown when one player is looking at another player's Gamercard 172 during an online session. The online base area 174 includes details such as the player's Gamertag, gamer tile, overall community rating/reputation, gamer Cred (a points-based reward points system), gamer zone, country, membership tier, awards, etc. An offline Gamercard 172 is shown when a player is looking at his/her own Gamercard 172. The offline base area 174 can include a subset of the online base area and can further include information regarding titles played and time played. The base area 174 of a Gamercard 172 is preferably fixed in size, has a consistent, static layout and has a fixed placement of all information elements, such as Tile or Gamer Cred.

The extended area 176 can include a set of Gamercard Actions, such as "View Profile" and "Send Feedback," etc. The extended area of the Gamercards is preferably not fixed in size, because it can vary based on the context. As shown in FIGS. 5-7 a user can scroll through the list of other users via the guide 156 and a friends list 178. The Gamercard for other users can be displayed as the user scrolls among his/her friends or the user can be presented with an option to see a full view of the Gamer Profile. The full view mode consists of different views of the extended area 176 and can include several sections, such as a Profile Summary, Community Feedback, Game Achievements, Activity, and Social Network. The guide 156 can advance through the list of friends, recent players (and summary sections for each player), a user home page for navigating to various options and settings, etc.

The profile summary includes information regarding number of games played, time played, tile, greeting, etc. The community feedback includes ratings on style, sportsmanship, language, cooperation, etc. The game achievements section includes recent titles, experience points (gamer Cred), time played, game-specific stats and achievements, etc. The activity section includes Gamer Cred earned, sessions played, total time played, active days on the service, etc. The social network includes friends, groups, positive/negative feedback count, etc.

Matchmaking and Session: For online, multi-player games, Matchmaking connects a game player to a session. A Match made session is an instance of game play that includes two (2) or more gamers playing a game until they either decide to terminate the session or until the session meets its end criteria (as defined by the game). The person who creates the session is the host. Some games are hostless, meaning that the game does not assign any special function to the person who originated the game. In such a case, the originator can, in fact, be a person who was searching for a session with specific criteria and, when it was not found, the game created a session for the person and advertised it for others to match into it. Matchmaking involves joining a session that has, as a minimum, one player already in place. A session is said to be joinable if there are open slots available to the person seeking a slot and the game play has not yet begun (the game is in "lobby" state). Some games that have join in progress sessions will advertise that a session is joinable until every public slot is filled. A gamer makes a Match by selecting "Matchmaking" in a game or in an out-of-game Matchmaking system. The Matchmaking UI can allow a gamer to add some filters to his search for a session (e.g. like specifying a map or difficulty level), or it can push a gamer directly into a search query. In most cases, with or without filters, a gamer is given a session search result which consists of a list of sessions. In the case of a search result, a gamer then selects a session and joins it. Typically, a player then enters a lobby and awaits other players to match into the game before game play begins. In some cases, no search result is shown, and players are dropped instead directly in the lobby of the game that best meets their search criteria.

Social Matchmaking with the Affiliates List: When a game player chooses to Matchmake into a session, in the first session he plays, the profile data (including such things as the Gamer Zone and Cred) he has set describing himself is used to "prime the pump" and find the best fellow new gamers to play with. As he continues to play additional session, the game player associates with a group of fellow gamers who become "Recent Players" on the Affiliates List. The service preferably prioritizes playing with Recent Players over strangers in future session, but once a game player give positive feedback, these "positive feedback" people are remembered by the system and are given even higher priority in the Affiliates List. Over time, as a gamer becomes very familiar with a set of players, he invites them to become friends. These friend garners are given the highest priority.

This Matchmaking system will connect people who have similar intent and who share a similar profile to insure that they all have a good time, in and out of game play (but primarily in game play). Matchmaking—with its use feedback and profile data—facilitates people expanding and refreshing their online community with increasingly refined matches over time. Ultimately, Matchmaking will bind people to the service as a safe, secure place to meet new people and create a history of positive experiences.

Details on Query-Based Social Matching on User Profile: Several of the aspects of User Profile that surface in a Gamer Card can be used to match a game player to a session. At a high level, according to an aspect of reputation determination when a game player signs up in the service 150, he is asked to select a Gamer Zone that best describes the kind of social environment he prefers to play in. The Gamer Zone is indicative of a range of socially acceptable game sessions. Before the service has other profile data to use, this Gamer Zone is used to match the game player with other players who have selected the same Zone. In general, attributes of the members in a session are combined to form a session value and the session value is compared with the player's Gamer Zone. This comparison can be accomplished in any appropriate manner. Examples of how this comparison can be accomplished include comparing the player's Gamer Zone with the Gamer Zone of the host of a session; performing a database query looking for Social sessions that contain a majority of players with the same, or approximately the same, Gamer Zone; averaging the ratings of all players in a session to create a session rating and compare the session rating with the player's Gamer Zone; comparing the player's Gamer Zone with a session value within a statistical tolerance; or any combination thereof.

As time goes on and the service has additional data about each player, this Match query can be improved by averaging multiple key aspects of User Profile (still the Zone, but as time goes on, also Feedback Reputation, skill computed via stats, and his experience defined by Achievements achieved) for each participant in a session. The system then can provide a session "profile" that can be compared with the User Profile of a player seeking a match. The match system can then query this session profile by comparing it to the values in a User Profile of an individual who wishes to join the session. If the match of the User Profile is sufficiently close to the session profile values (sharing the same Zone and within a pre-specified range for each of the numeric values for reputation, skill, and experience), then the user will be shown that session as a Match. If the match comparison is not within the pre-specified ranges, then the user's query will continue on to compare to other sessions' session profiles until a positive result is achieved. In an exemplary embodiment, NAT type, physical proximity to other players, time played on the system, games played, etc. all are folded in on the back end when a Match search is performed.

Details on Social Matchmaking by Network of Affiliates: In addition to Matchmaking based on a query with User Profile, the Social Matchmaking system, in conjunction with the tracking of friends, recent players, and feedback on recent players, builds a network of Affiliates who are prioritized for Match.

The Affiliates list is a prioritized list of people for a player, stored in the online service and also cached locally, that includes (1) Friends (i.e., people who the player has invited, and who have accepted the invitation, to a preferred social network that allows exchange of messages and state information), (2) Positive Feedback people (i.e., people about whom the player has given positive feedback), and (3) Recent Players. The Social Matchmaking service always looks first (before conducting the query above) for the presence of Affiliate sessions on the service. If any person on a player's Affiliates list is online and in a joinable session, the service will return that session. If there are multiple Affiliate sessions, the ones with Friends are given priority over those with Positive Feedback People or those with Recent Players. Positive Feedback People are given priority over Recent Players. Additionally, sessions that contain users about whom the person has given negative feedback are given the lowest priority.

In accordance with the above, FIG. 6 illustrates a list of Recent Players in the guide 156. A person is added to a player's Recent Players list when the player has played an online game session with the person. The Gamercard displayed when browsing recent players shows the base area and an extended area that provides information regarding recent games, feedback, and presence of the recent players. FIG. 7 illustrate further details that can be obtained about recent players, such as general achievements.

Details On Feedback, Affiliates List, Reputation, And Cheater Avoidance: Feedback provides an at-a-glance measure ("reputation") to all other garners of how good of a partner a particular gamer will be in game. Utilizing this rating, another gamer can consider whether or not to play with a person. Feedback separates Reputation from Complaint. Reputation is a public score that can be used internally to improve Matchmaking and develop an Affiliates list. Complaints are private notifications wherein one gamer reports another gamer's violation of (of a gaming Code of Conduct). In an exemplary embodiment, the issuer of a Complaint receives a response message acknowledging the Complaint, and the complainant is notified accordingly.

FIGS. 8 and 8A-8H illustrate a user interface for the feedback mechanism whereby a game player can provide feedback on other game players. Preferably, this feedback options should only be available on a Gamer Card when the viewing player has played with the person before. This feedback information is then used to improve matchmaking results, i.e., indicates whether or not you would want to play with this game player in future games. By giving positive feedback on a game player, that person moves up in priority in that feedback provider's Affiliates list, as described above. Moreover, the feedback affects the reputation of the game player receiving the feedback and can change the group of players with whom the player is group in future games.

Such a system allows the community to police itself as much as possible while still offering a path to tell the service about serious "bad actors." The system separates out two paths: (1) peer-to-peer feedback ("Player Reviews") and complaints to the service and (2) gamer tools to tell each other reasons why they don't like playing each other.

In an exemplary embodiment, the feedback system is leveraged to improve Matchmaking and to build an affiliates list. Preferably the system tracks peer-to-peer feedback and allows a player to give feedback on another player only one time (when they play online together). Preferably, a positive Player Review adds a gamer to the Affiliates list; whereas a negative Player Review adds a gamer to an Affiliates "black list."

Feedback is, then, for the purposes of Matchmaking, the creation of a "one-way" friends list, i.e., a low threshold mechanism to build a list of people you meet again and again. This mechanism is generally transparent except as an improved matchmaking experience. For example, when a game player indicates that he would like to play with a particular game player again, the system tracks that information in a one-way friends list so that the other player doesn't have to be invited or accept an invitation to be on a friends list. Moreover, the other player may not even know his or her status vis-à-vis the player providing the feedback.

If a player gives negative feedback on a player, that player moves to an "Avoid" category on the Affiliates List, and for the purposes of Social Matchmaking, all future sessions containing that person will be avoided for the player. The player who received the negative feedback is given a hidden list of players he should avoid so that his session results won't contain players who have chosen to avoid him.

Figure 8:
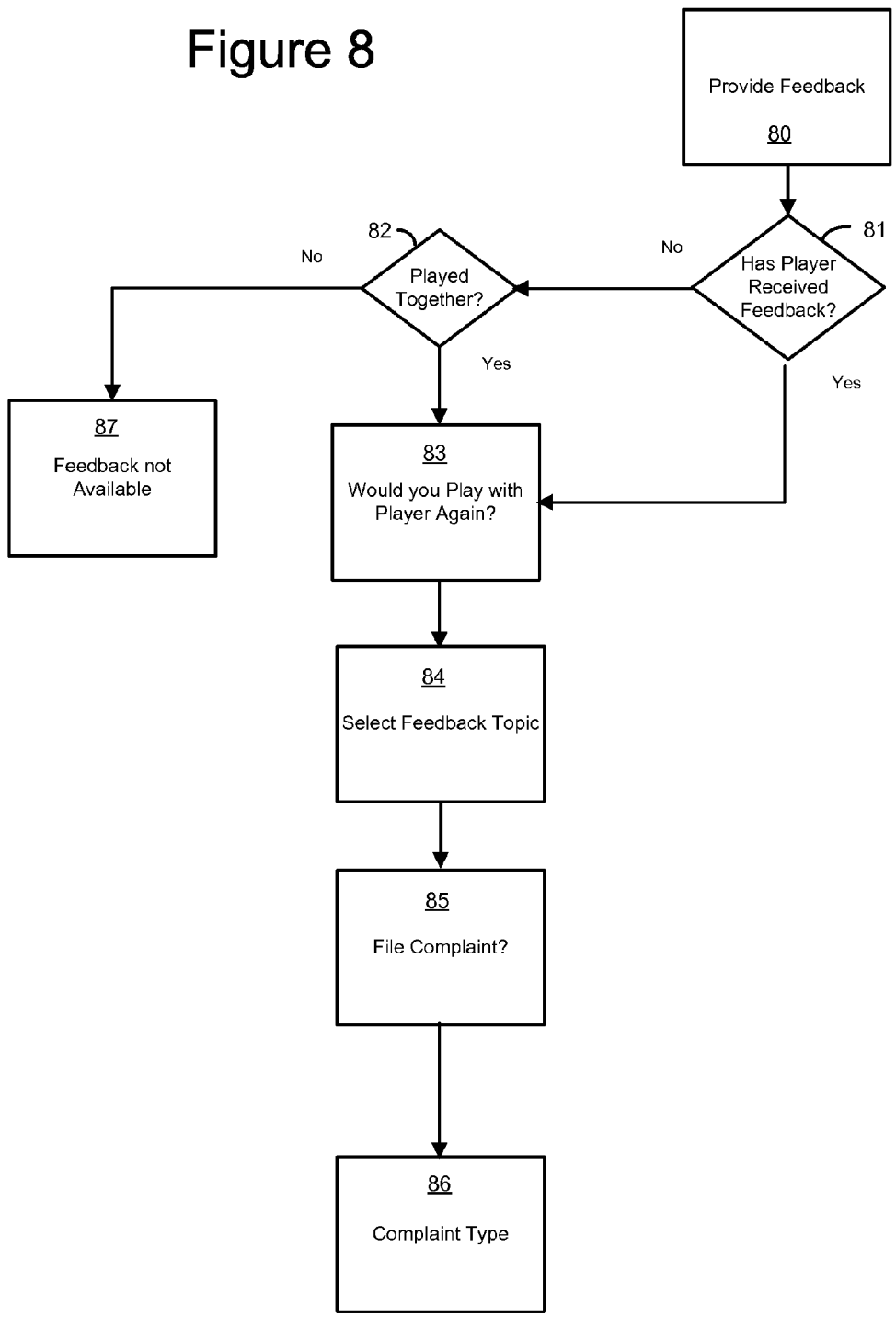
FIG. 8 illustrates a flow diagram for providing feedback on game players.
Figure 8B:
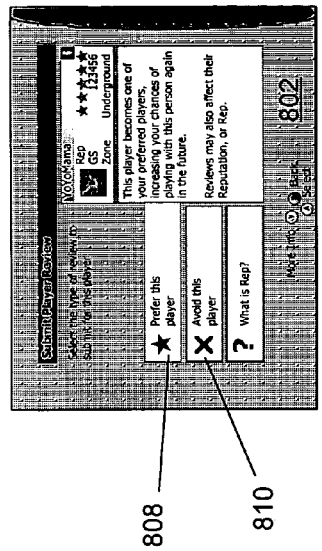
FIGS. 8A-D illustrate an example user interface for providing feedback on game players.
Figure 8A:
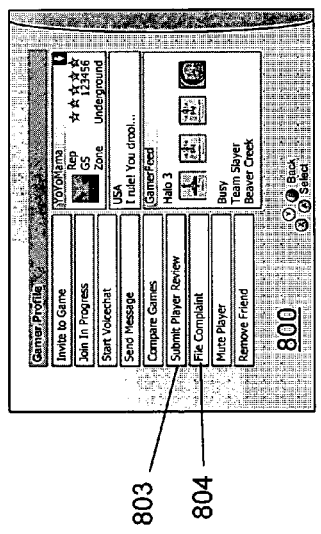

Turning to FIG. 8, when a player has joined a game with another player, the service determines that the two players have come together in a session and offers the player the opportunity to provide feedback on the other player from the game (step 80). FIG. 8A illustrates a UI wherein the user is offered the opportunity to select a feedback button to provide feedback on the other player. The user is offered the opportunity to select the Player Review button 803 or the File Complaints button 804. If the complaint button is selected then the UI illustrated by card 820 (FIG. 8E) is provided.

A determination is made whether this is the first time that this player has received feedback (step 81). If so, the service sets up all of the appropriate initializations for that player to receive feedback. If not, it is determined whether feedback can be given for this player, e.g., by determining whether feedback has previously been provided by the same other player or whether they have ever played together (step 82). If not, the service provides a message indicating the feedback is not available (step 87). If the player can receive feedback (i.e., if he has played with the other player), then the service records whether the feedback is positive or negative (whether the feedback provider chooses to increase their chances of playing with the other player or decrease them) (step 83). If the player has submitted feedback on the second player before, the player is provided the opportunity to change the previous entry. As illustrated in FIG. 8B, the player is given a choice to Prefer a player (increase the chances of playing with them again) or to Avoid the player (decrease chances). If Prefer is selected (button 808), the player is added to the feedback providers affiliates list, positive feedback is recorded, and the feedback is complete. The feedback is aggregated as part of the player's overall feedback score/reputation.

Figure 8D:
Figure 8C:
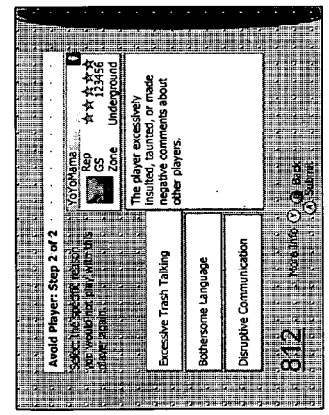

If Avoid (button 810) is selected, the feedback provider is requested to select a feedback category and a specific reason (e.g., the player showed immature behavior under the Game Behavior category, was too good under the player skill category, used disruptive voice under the communication category, and so on) (step 84). FIG. 8C provides an illustrative UI that shows a set of reasons in a specific category that can be presented from which a feedback provider can select. FIG. 8D illustrates how the feedback is aggregated into a player's reputation 816. Here, player YoyoMama's accumulated negative feedback is shown.

Figure 8F:
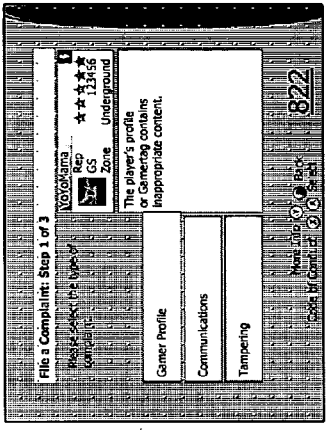
FIGS. 8E-H illustrate an example user interface for filing complaints about other game players.
Figure 8H:
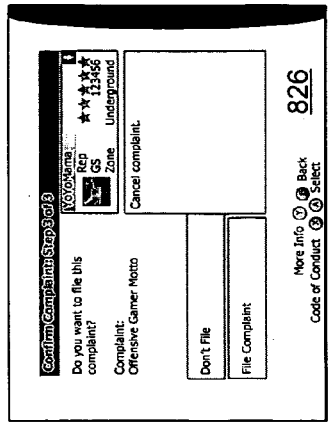
Figure 8E:
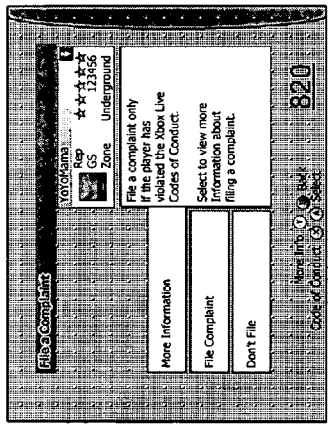
Figure 8G:
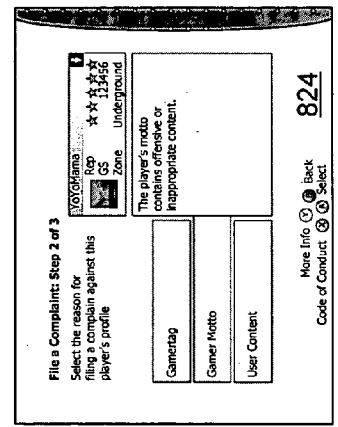

Thereafter, the feedback is recorded and the feedback provider is offered the opportunity to also file a complaint (step 85). The type of compliant is also recorded (step 86). FIGS. 8E-H further illustrate the complaint feedback UI. In FIG. 8E, the feedback provider has selected the complaint button 804 and proceeded directly to filing a complaint by way of screen 820. In FIG. 8F, the feedback provider is asked to select a category of complaint to be filed as shown in screen 822. The feedback provider is asked to provide a specific reason for the complaint. FIG. 8G illustrates specific reason option topics for filing a complaint in screen 824. Finally in the screen 826 of FIG. 8H, the confirmation of the complaint filing is provided. This complaint system, which focuses on code-of-conduct violations, is separated from the feedback system (which focuses on game play). Any number of complaints can be filed by one player on another because of legal policy requirements. Feedback, however, focuses on building social networks.

Calculating Reputation: An unavoidable characteristic of human nature is that people will attempt to cheat to make their reputations appear artificially good or better. For example, people can cheat by encouraging friends to provide artificially positive or negative feedback about others. To mitigate the detrimental effects of cheating, a player's reputation is determined; based, in essence, on the number of people the player has annoyed normalized by the number of people the player has had the opportunity to annoy. Or, stated differently, a player's reputation is determined by the number of people who have provided negative feedback about the player, normalized by the number of people the player has encountered via game play. By continually analyzing the way strangers react to a particular player, the service can identify artificially induced feedback content. The number of people a player has annoyed is determined by the number of people who have placed the player on their "Avoid" list. The number of people the player has had the opportunity to annoy is determined by: (1) the number of people who have completed a game session with the player, or (2) the number of people who have started, but not completed, a game session with the player and have put the player on their "Avoid" list. Friends are considered people the player has had an opportunity to annoy.

Figure 9:
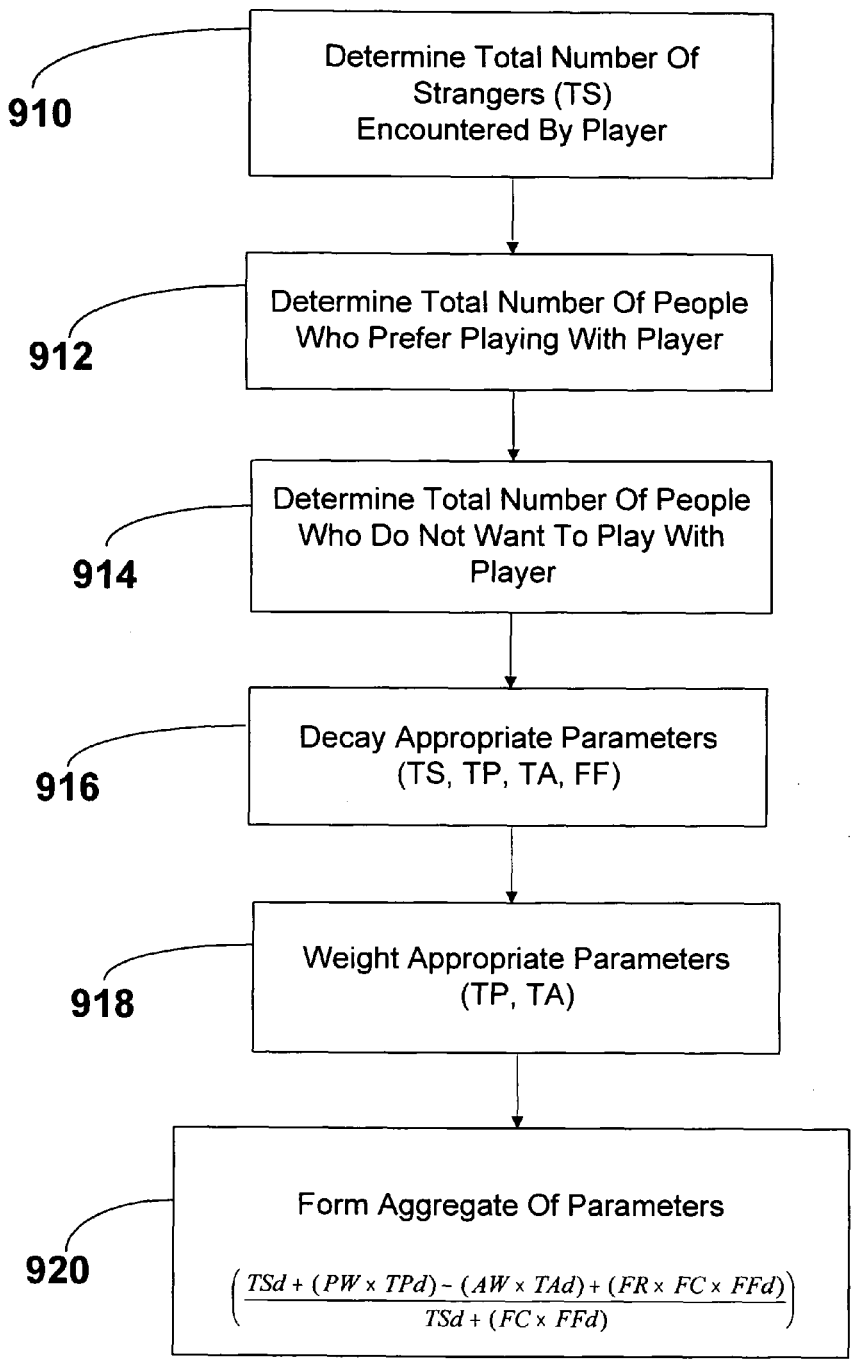
FIG. 9 is a flow diagram of an exemplary process for determining a reputation of a player.

FIG. 9 is a flow diagram of an exemplary process for determining reputation. A player's reputation consists of an aggregation of that player's positive and negative feedback. In an exemplary embodiment, a player's reputation is determined by the total number of strangers encountered by the player, the total number of people who prefer playing with the player (on "Prefer" list), and the total number of people who do not want to play with the player (on "Avoid" list). This can be represented by the following formula:

$$REPUTATION = \frac{TS + TP - TA}{TS}, \quad (1)$$

where:
TS represents total number of strangers encountered by the player,
TP represents the total number of people who prefer playing with the player (on "Prefer" list), and
TA represents the total number of people who do not want to play with the player (on "Avoid" list).

Accordingly, the total number of strangers, TS, encountered by the player is determined at step 910, the total number of people who prefer playing with the player is determined at step 912, and the total number or people who do not want to play with the player is determined at step 914. A player's reputation can be determined in accordance with Equation (1). To provide a more dynamic value of reputation however, various parameters used to determine reputation are decayed and/or weighted.

Parameters are decayed at step 916. In an exemplary embodiment, parameters used to determine a player's reputation are decayed (weighted as a function of time) to provide a more temporally accurate determination of the player's reputation. Parameter values are decayed as additional game sessions are conducted. The chronological passage of time alone does not decay a parameter. Decayed parameters include the total number of strangers encountered by a player, TS, the total number of people who prefer playing with the player, TP, the total number of people who prefer to avoid playing with the player, TA, and as described in more detail below, an optional factor (referred to as a fudge factor), FF, indicative of a player's history. Decaying parameters used to determine a player's reputation provides a means for a player to change his/her reputation as additional games are played.

Parameters are weighted at step 918. In an exemplary embodiment, parameters used to determine a player's reputation are weighted to reflect the relative importance of the parameter. Weighted parameters include the total number of people who prefer playing with the player (on "Prefer" list), TP, and the total number of people who prefer to avoid playing with the player (on the "Avoid" list), TA. For example, positive feedback can be weighted less heavily than negative feedback. This sends the message that playing nice is expected, and is not overly rewarded. Negative feedback can be weighted more heavily to prevent "bad" behavior.

Parameters are aggregated to determine a player's reputation at step 920. In an exemplary embodiment, utilizing weighted and decayed parameters, the aggregation is in accordance with the following equation:

$$REPUTATION = \frac{TSd + (PW \times TPd) - (AW) \times TAd) + (FR \times FC \times FFd)}{TSd + (FC \times FFd)}, \quad (2)$$

where:

TSd represents a decayed value of the total number of strangers (not listed on an Affiliations list) a player has played with. A stranger is another person with whom the player has not been in a previous game session.

PW represents a multiplicative weight associated with the total number of people who prefer to play with the player.

TPd represents a decayed value of the total number of people who prefer to play with the player.

AW represents a multiplicative weight associated with the total number of people who prefer to avoid playing with the player.

TAd represents a decayed value of the total number of people who prefer to avoid playing with the player.

FFd represents a decayed "fudge factor" indicative of the player's history, which is can eventually decay away. The fudge factor is provides padding to a player's starting reputation. By giving each player a little padding, the impact of the early real reputation activity will not disproportionately affect a player's reputation. This padding decays way over time.

FC represents is a "fudge coefficient" that is a multiplicative weight of the decayed fudge factor (FFd), and FR represents a "fudge ratio" that is the ratio of positive to negative values in the fudge factor.

A parameter value is decayed by multiplying it by a decay rate value (DR). Each time reputation is calculated, the previous value of a decayed parameter is multiplied by the decay rate value and added to the new parameter value. For example, when calculating a current value of a player's reputation, a new aggregate decayed value of the total number of strangers ($TSd_{new}$) is calculated by multiplying the value of the previous decayed value of a total number of strangers ($TSd_{old}$) by the decay rate value (DR), and adding to this product the current total number of strangers ($TS_{current}$). This is represented by the following formula.

$$TSd_{new} = (TSd_{old} \times DR) + TS_{current} \quad (3)$$

Similarly, new aggregate decayed values for the total number of people who prefer playing with the player ($TPd_{new}$), the total number of people who prefer to avoid playing with the player ($TAd_{new}$), and the fudge factor ($FFd_{new}$) can be represented, respectively, by the following formulas.

$$TPd_{new} = (TPd_{old} \times DR) + TP_{current} \quad (4)$$

$$TAd_{new} = (TAd_{old} \times DR) + TA_{current} \quad (5)$$

$$FFd_{new} = FFd_{old} \times DR \quad (6)$$

Note, that the value of the decayed fudge factor, FF, asymptotically approaches zero. Use of the fudge factor is optional.

Weights and the decay rate are adjustable. Thus, weights and decay rates can be adjusted for a particular scenario, at period intervals, and/or when deemed appropriate. In an exemplary embodiment, PW is assigned a value of 0.025, AW is assigned a value of 2.4, and DR is assigned a value of 0.925. Note that using these weights, bad performance is weighted more heavily than good performance, and that the fudge factor, FF, eventually becomes negligible. The description of DR above, utilizes a single value for DR, however, the application of DR is not limited thereto. It is envisioned, that alternate embodiments utilize different values of DR for each parameter. For example, the value of DR multiplied by TS can differ from the value of DR multiplied by TA, each of which can differ from the value of DR multiplied by TP.

Figure 10:
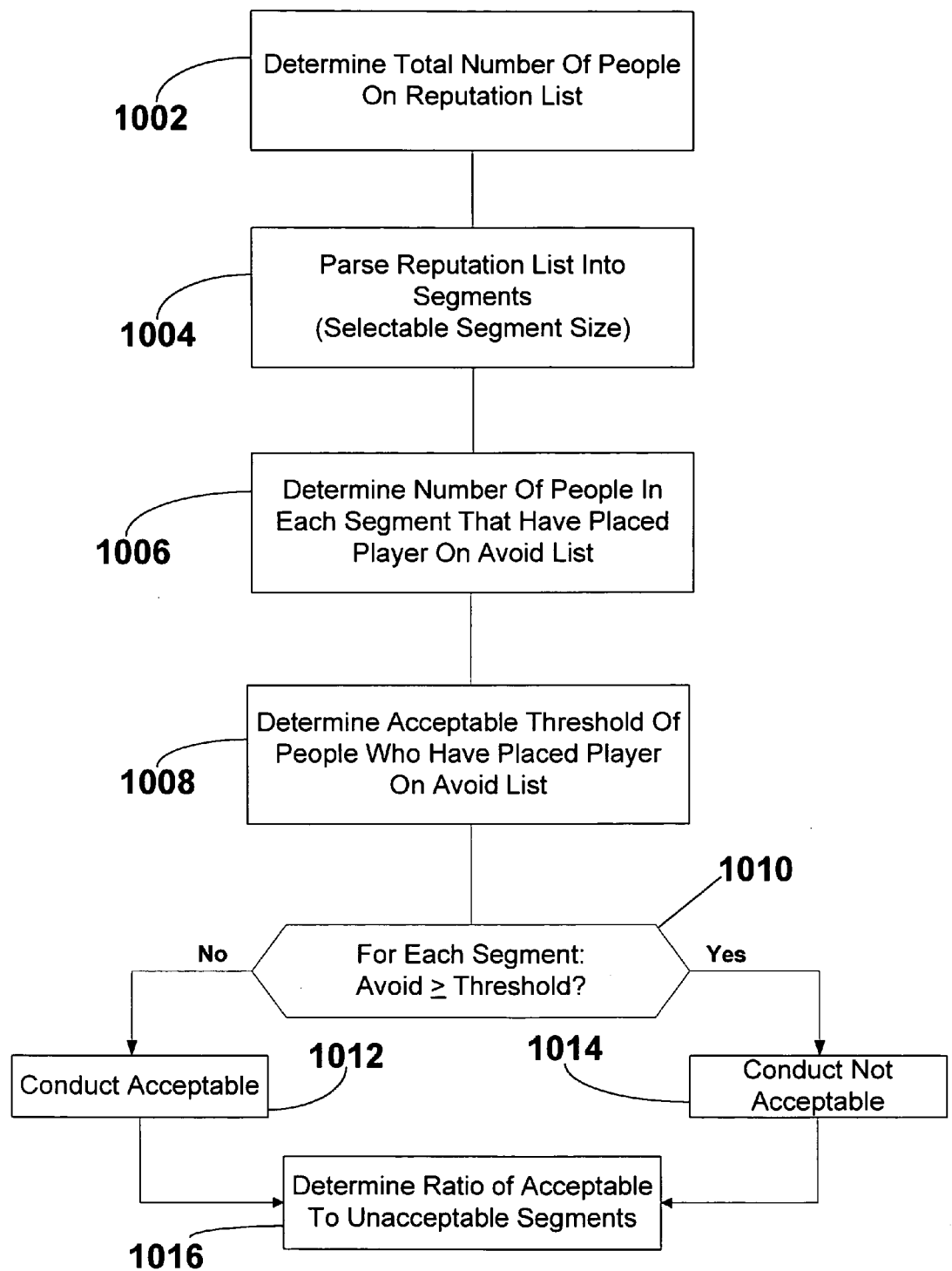
FIG. 10 is another flow diagram of another exemplary process for determining a player's reputation.

FIG. 10 is a flow diagram of another exemplary process for determining reputation. In an exemplary embodiment, to provide flexibility and a higher degree of resolution in determining reputation, the calculation of reputation is performed on segments of a player's reputation list. A reputation list is a list of people who qualify as people a player has had an opportunity to annoy. A person encountered by a player in a game in which either the player quits or the person quits, is added to an affiliates list called "encountered players." The person is not considered a stranger. Feedback can be provided about the person, however, in an exemplary embodiment, the person does not get preferred in matchmaking.

The total number of people on a player's reputation list is determined at step 1002. The reputation list is parsed into segments at step 1004. In an exemplary embodiment, the segment size is adjustable. Thus, any appropriate segment size can be selected. As will be become evident below, smaller segment sizes will effect the reputation determination more quickly than larger segment sizes. Various techniques for determining segment size and number of segments are envisioned. For example, a fixed segment size can be established, and the reputation list can be parsed into segments of the established size (with, possibly one segment being smaller than the established size). Or, the reputation list can be divided into a fixed number of segments having equal size (again, with possibly one segment being smaller than the others). Or, a combination of these two techniques can be utilized. In the aforementioned techniques, residual members of the reputation list can be included in a segment of smaller size, or can be ignored. Further, members of a reputation list can be assigned to segments contiguously, or in any appropriate manner.

The number of people in each segment that have placed the player on their respective Avoid lists is determined at step 1006. A threshold value indicative of an acceptable number of people who have placed the player on their respective Avoid lists is determined at step 1008. For example, a threshold of 1 out of 7 (approximately 14%) people can be utilized. This is equivalent to the player being placed on the Avoid list of one person in an 8-player game. Thus, if the player was placed on greater than approximately 14% of the Avoid lists of the people in a segment, the player is determined to have harmed that segment. If the player was placed on less than approximately 14% of the Avoid lists of the people in a segment, the player is determined to have not harmed that segment. The threshold value affects the frequency with which a player can be put on Avoid lists before the player is considered to have harmed a segment. In an exemplary embodiment, a segment size comprises 20 people and the threshold value is 14.3%. Accordingly, if a player is places on the Avoid list of 3 or more (20×14.3%=2.86, rounded up to 3) people from a segment, the player is deemed to have harmed the segment.

For each segment, it is determined if the number of people who have placed the player on their respective Avoid lists is equal to or exceeds the threshold value (step 1010). If so, the player is determined to have harmed the segment at step 1014. Thus, the players conduct is deemed to be not acceptable. If not, the player is determined not to have harmed the segment at step 1012. Thus, the players conduct is deemed to be acceptable. The ratio of the number of segments in which the player's conduct was deemed unacceptable to the total number of segments is determined at step 1016. In an exemplary embodiment, a representation of this ratio, or score, is observable by other players.

Figure 11:
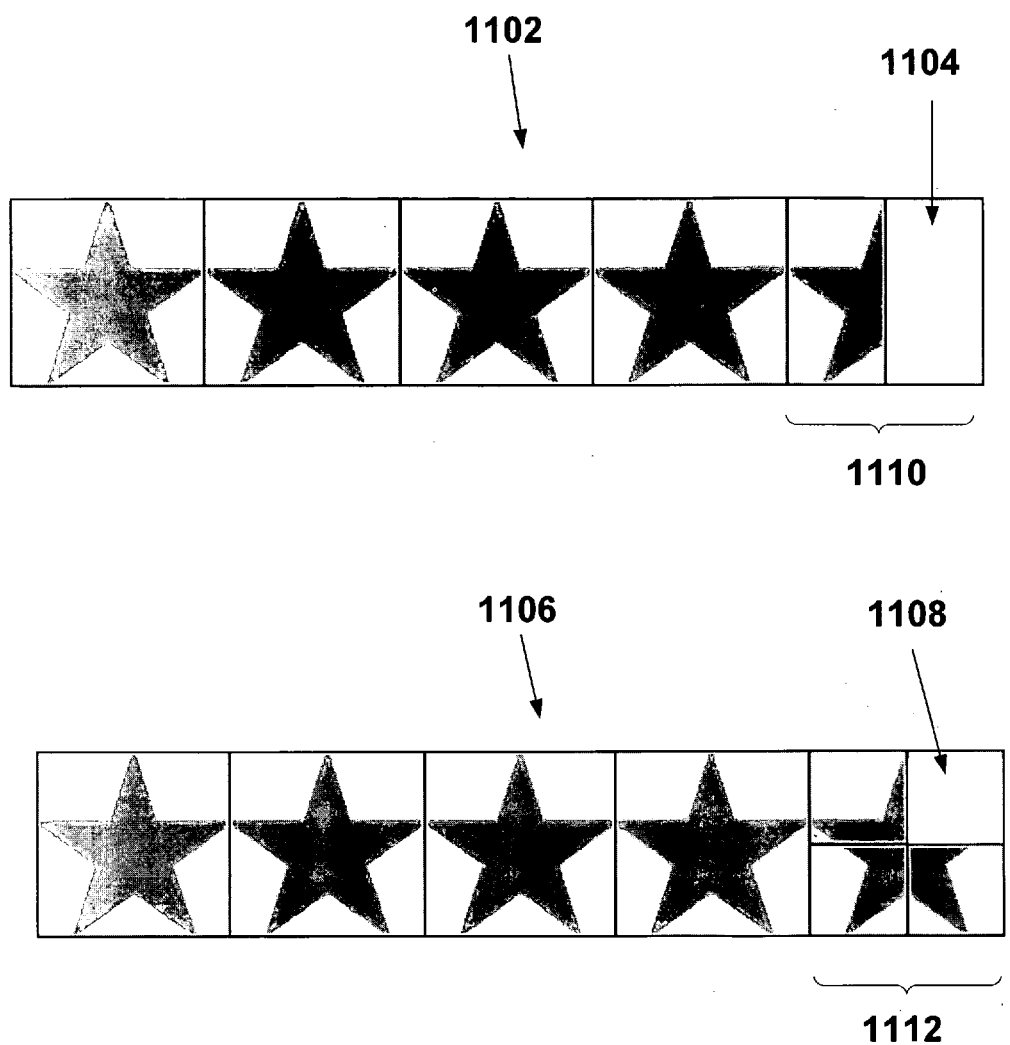
FIG. 11 is an exemplary depiction of a payer's reputation score.

FIG. 11 is an exemplary depiction of a reputation score. The depictions shown in FIG. 11 are intended to be intuitive, and are thus illustrated iconically. Each of the depictions 1102 and 1104 represent a player's reputation score, referred to as a star rating. A star rating ranges from 0 (zero), showing no stars to 100, showing 5 complete stars. A star rating of 0 is the worst reputation score possible and a star rating of 100 it the highest reputation score possible. Each star rating depicts five stars, each of which can represent up to 20 points. Thus, five complete stars represent 100 points. Each star can be divided into quarters, each quarter representing 5 points. A single quarter of a star represents 5 points, two quarters of a star represents 10 point, and three quarters of a star represents 15 points. Quarters of a star can be masked, colored, shaded, or any appropriate combination thereof. Star rating 1102 indicates a reputation score of 90. Half 1104 of star 1110 is masked, indicating that star 1110 represents 10 points. Adding the star values in star rating 1102 results in a reputation score of 90 points. Star rating 1106 indicates a reputation score of 95. One quarter 1108 of star 1112 is masked, indicating that star 1112 represents 15 points. Adding the star values in star rating 1106 results in a reputation score of 95 points. It is emphasized that the depicted star rating is exemplary, and that any appropriate indication of reputation can be utilized.

Figure 12:
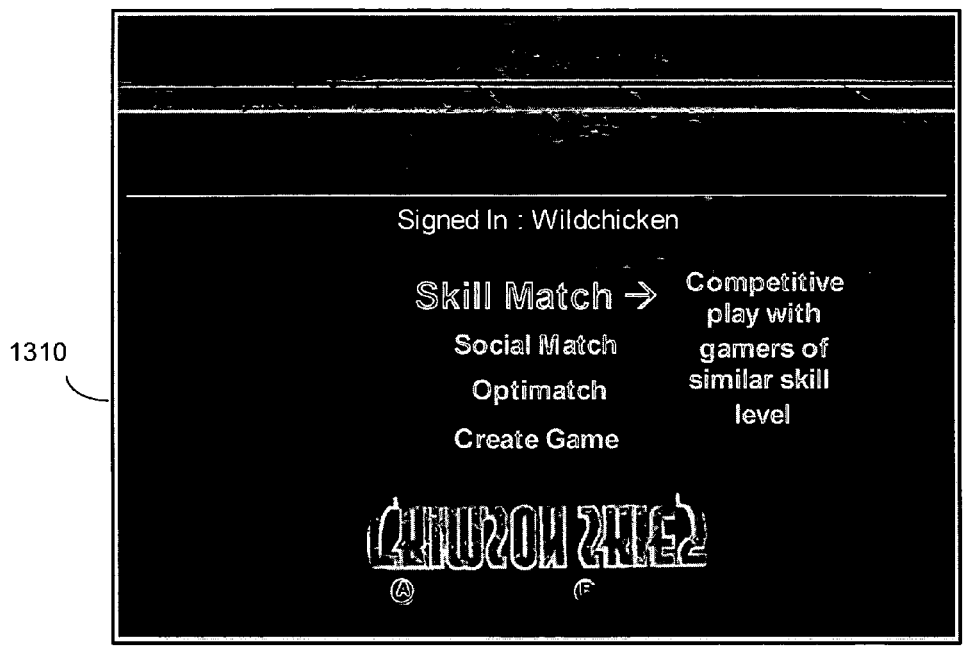
FIGS. 12-15 illustrates a user interface whereby a user can initiate a matchmaking.
Figure 13:
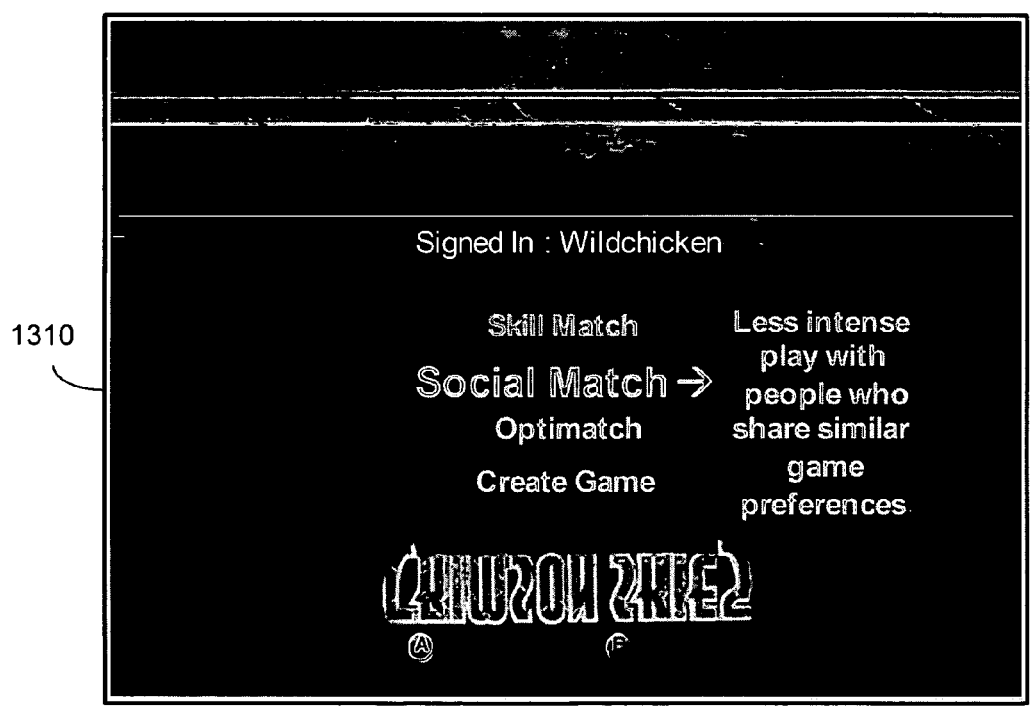
Figure 14:
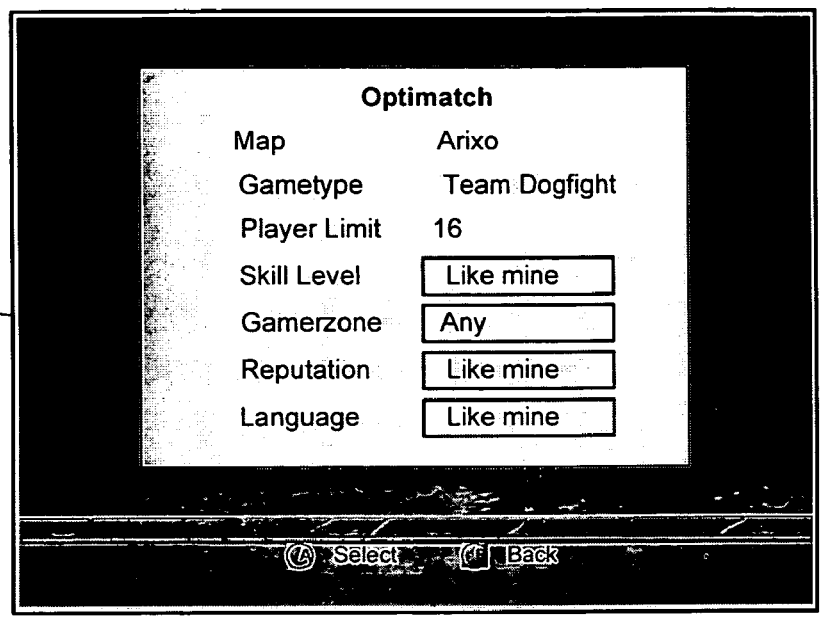
Figure 15:
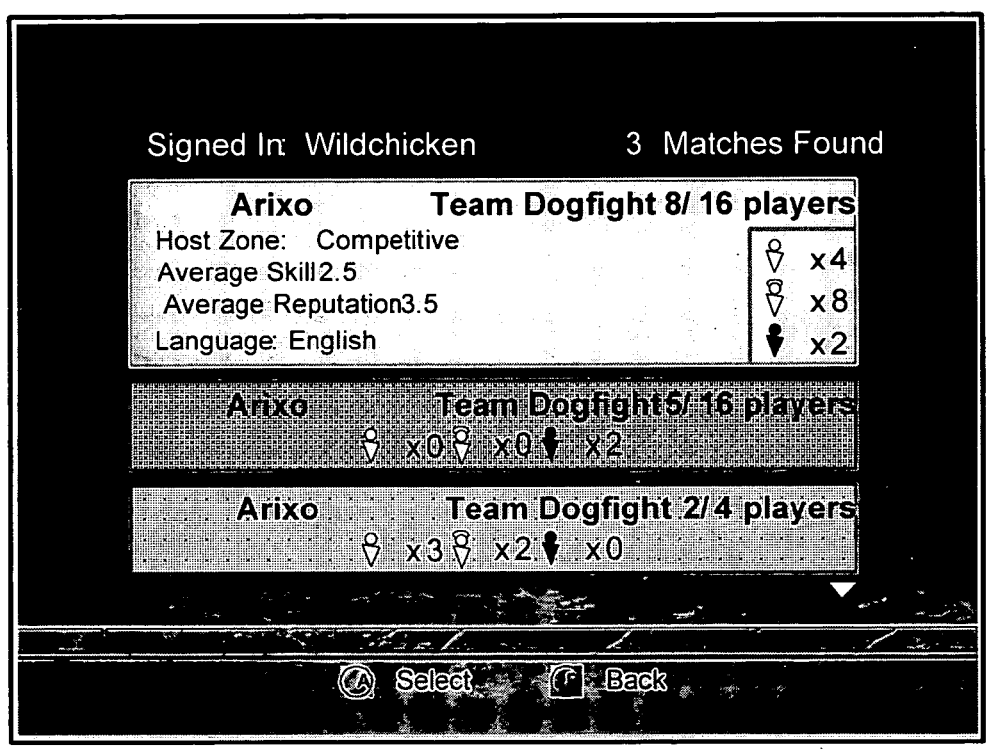

Social Matchmaking Interface: FIG. 12 illustrates a user interface 1310 whereby a user can select the type of interaction desired for a particular game. Here for example, the user has selected from within the crimson skies game that he wants to play a skill match with game player of equal or higher skill level. This is not a Social Match. FIG. 13 illustrates a similar user interface 1310 wherein the user has selected the option of playing a Social Match. Additionally, the user has the option of selecting an Optimatch wherein the user selects the specific game criteria or options to use in the selection process. As shown in FIG. 14 in an exemplary Optimatch user interface 1332, when a user selects Optimatch he can specify whether or not he wishes the service to take into account his skill level, gamer zone (e.g., competitive or social), reputation, or language when conducting the Match. This feature allows the player to optimize the Social search criteria according to personal preference. A player may not, however, specify that he wishes to search for sessions skewed far from his own settings. In the case of reputation, for example, it may not be desirable to let a low reputation player single-out high reputation people to play with. FIG. 15 illustrates three matches that meet the criteria specified by the user (a similar display would be presented for any one of the above selected match options). The icons with the ×4, ×8, ×2 next to them represent the number of Affiliates in each session.

Figure 16:
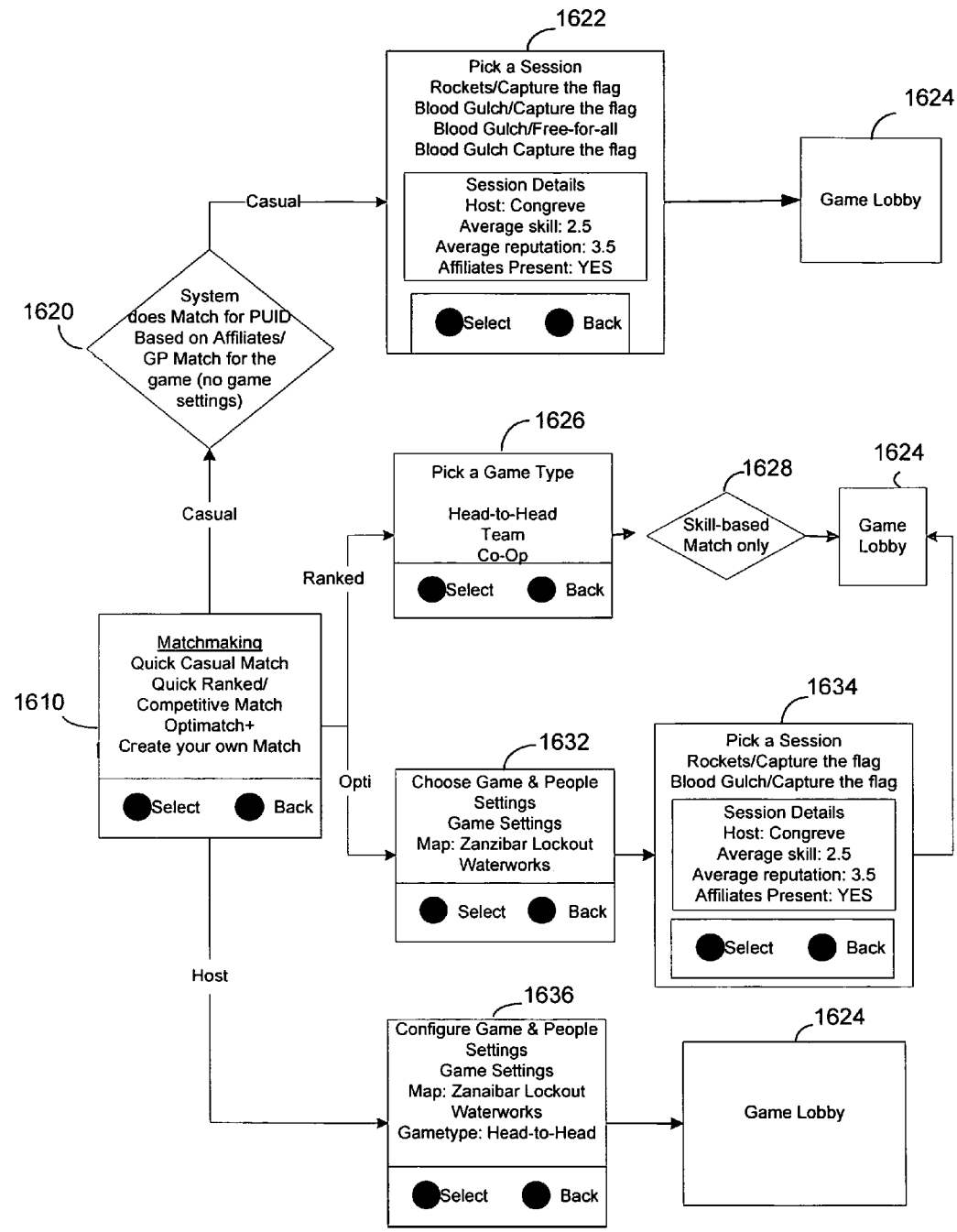
FIG. 16 illustrates a flow chart of the matchmaking options.

FIG. 16 provides an overall flow chart that illustrates the flow of the UI options for matching that are selectable by a player. Initially, at screen 1610 (which parallels the image show in FIGS. 12 and 13), the user is presented with a variety of matchmaking options. The player could simply select the option of playing a "casual" social game and letting the system provide the matching set of game players at step 1620 and as described above. In that instance, a set of user would be selected based on affiliates, most recently played, etc. Thereafter, the user would be presented with a screen 1622 containing a variety of session that matched. After the user selects one of the sessions, he would go to lobby 1624 and wait for the game session to be started.

Similarly, at screen 1610, the player could select a ranked or skill-based game and move to screen 1626. At that screen, the player would then select whether the game should be head-to-head, team, etc. That would preferably allow only skill based players at step 1628 to enter the lobby 1624 to wait for the game session to be started. Alternatively, the player could select the option matching from the main screen 1610 and go to screen 1632 to enter match options. Thereafter, a set of matching game session would be presented at screen 1634 from which the player or the system could select and again go to lobby 1624.

Additionally, the player could, instead of joining a session created by another user, elect to host a game session by specifying the criteria for joining the session as indicated by screen 1636. Thereafter, the player would wait in the lobby for other players that joined the game session, e.g., by selecting the proper criteria from the matchmaking system.

While reputation determination of an on-line game player has been described in connection with the preferred embodiments of the various Figures, it is to be understood that other similar embodiments can be used or modifications and additions can be made to the described embodiment for performing the same function of reputation determination without deviating therefrom.

What is claimed is:

1. A method for determining a reputation of a gamer of a multi-player computer-based game, said method comprising:

determining a number of players who have provided negative feedback about said gamer;

determining on at least one computer a quotient by dividing said number of players who have provided negative feedback about said gamer by a number of players said gamer has encountered via game play;

determining a first value indicative of a total number of strangers said gamer has encountered via game play;

determining a second value indicative of a total number of players who have respectively registered an explicit decision to play with said gamer, the explicit decision to play with said gamer based on at least partial game play experience between the respective players and said gamer;

determining a third value indicative of a total number of players who have respectively registered an explicit decision not to play with said gamer, the explicit decision not to play with said gamer based on at least partial game play experience between the respective players and said gamer; and forming an aggregate of said first value, said second value, and said third value, the quotient, the first value, and the aggregate being indicative of a reputation of said gamer.

2. A method in accordance with claim 1, further comprising:

providing an indication of said reputation, wherein said provided indication is observable by players of said multi-player computer-based game.

3. A method in accordance with claim 2, further comprising providing an iconic representation of said reputation of said gamer.

4. A method in accordance with claim 1, wherein said aggregate is formed by performing the acts of:

determining a sum of said first value and said second value;

determining a difference of said sum minus said third value; and dividing said difference by said first value.

5. A method in accordance with claim 1, wherein:

said first value is indicative of a first product of:

a decay rate; and said total number of strangers said gamer has encountered via game play;

said second value is indicative of a second product of:

a decayed rate;

a first weight associated with the total number of players who have respectively registered an explicit decision to play with said gamer; and said total number of players who have respectively registered an explicit decision to play with said gamer;

said third value is indicative of a third product of:

a decay rate;

a second weight associated with the total number of players who have respectively registered an explicit decision not to play with said gamer; and said total number of players who have respectively registered an explicit decision not to play with said gamer; and said aggregate is formed by performing the acts of:

determining a sum of said first value and said second value;

determining a difference of said sum minus said third value; and dividing said difference by said first value.

6. A method in accordance with claim 1, further comprising:

determining a reputation list of said gamer, wherein said reputation list comprises players with whom said gamer has completed at least one game session;

parsing said players of said reputation list into a plurality of segments;

for each segment, determining a number of players who have respectively registered an explicit decision not to play with said gamer;

for each segment, comparing a threshold value to said number of players who have respectively registered an explicit decision not to play with said gamer;

for each segment, in accordance with a result of said act of comparing, determining that said gamer has one of: harmed a respective segment and not harmed a respective segment; and determining a ratio of harmed segments divided by a total number of segments, wherein said ratio is indicative of said reputation of said gamer.

7. A method in accordance with claim 6, wherein:

a segment is determined to be harmed if said number of players who have respectively registered an explicit decision not to play with said gamer is greater than or equal to said threshold value; and a segment is determined to be not harmed if said number of players who have respectively registered an explicit decision not to play with said gamer is less than said threshold value.

8. A method in accordance with claim 6, wherein segment size is adjustable.

9. A method in accordance with claim 6, wherein said threshold value is adjustable.

10. A system for determining a reputation of a gamer of a multi-player computer-based game, said system comprising:

a database server for storing:

feedback about said gamer;

information indicative of the total number of strangers said gamer has encountered via game play;

information indicative of a total number of players who have respectively registered an explicit decision to play with said gamer, the explicit decision to play with said gamer based on at least partial game play experience between the respective players and said gamer; and information indicative of a total number of players who have respectively registered an explicit decision not to play with said gamer, the explicit decision not to play with said gamer based on at least partial game play experience between the respective players and said gamer; and a service for:

accessing said database;

determining a number of players who have provided negative feedback about said gamer;

determining a total number of strangers said gamer has encountered via game play;

determining a quotient by dividing said number of players who have provided negative feedback about said gamer by a number of players said gamer has encountered via game play, wherein said quotient and the total number of strangers the gamer has encountered via game play are indicative of a reputation of said gamer;

forming an aggregate of:

said total number of strangers said gamer has encountered via game play;

said total number of players who have respectively registered an explicit decision to play with said gamer; and said total number of players who have respectively registered an explicit decision not to play with said gamer, the aggregate being further indicative of said reputation of said gamer; and providing an indication of said reputation, wherein said provided indication is observable by players of said multi-player computer-based game.

11. A system in accordance with claim 10, wherein:
said service is maintained on a server;
players connect to said service over a network via a game console; and
players provide feedback about said gamer via said network.

12. A system in accordance with claim 10, wherein:
said database server further storing:
a reputation list of said gamer, wherein said reputation list comprises players with whom said gamer has completed at least one game session; and
said service further:
parses said players of said reputation list into a plurality of segments;
for each segment, determines a number of players who have respectively registered an explicit decision not to play with said gamer;
for each segment, compares a threshold value to said number of players who have respectively registered an explicit decision not to play with said gamer;
for each segment, in accordance with a result of said comparison, determines that said gamer has one of: harmed a respective segment and not harmed a respective segment; and
determines a ratio of harmed segments divided by a total number of segments, wherein said ratio is indicative of said reputation of said gamer.

13. A computer-readable memory having computer-executable instructions for determining a reputation of a gamer of a multi-player computer-based game, said computer-executable instructions, when executed, performing the acts of:
determining a number of players who have provided negative feedback about said gamer;
determining a total number of strangers said gamer has encountered via game play;
determining a quotient by dividing said number of players who have provided negative feedback about said gamer by a number of players said gamer has encountered via game play;
determining a total number of players who have respectively registered an explicit decision to play with said gamer;
determining a total number of players who have respectively registered an explicit decision not to play with said gamer; and
forming an aggregate of:
said total number of strangers said gamer has encountered via game play;
said total number of players who have respectively registered an explicit decision to play with said gamer, the explicit decision to play with said gamer based on at least partial game play experience between the respective players and said gamer; and
said total number of players who have respectively registered an explicit decision not to play with said gamer, the explicit decision not to play with said gamer based on at least partial game play experience between the respective players and said gamer,
wherein said quotient, the aggregate, and the total number of strangers said gamer has encountered via game play are indicative of a reputation of said gamer; and
providing an indication of said reputation, wherein said provided indication is observable by players of said multi-player computer-based game.

14. The memory of claim 13, wherein players provide feedback about said gamer via a network and a game console.

15. The memory of claim 13, said computer-readable memory having further computer-executable instructions for:
determining a first product of:
a decay rate; and
the total number of strangers said gamer has encountered via game play;
determining a second product of:
a decayed rate;
a first weight associated with the total number of players who have respectively registered an explicit decision to play with said gamer; and
the total number of players who have respectively registered an explicit decision to play with said gamer;
determining a third product of:
a decay rate;
a second weight associated with the total number of players who have respectively registered an explicit decision not to play with said gamer; and
the total number of players who have respectively registered an explicit decision not to play with said gamer;
determining a sum of said first product and said second product;
determining a difference of said sum minus said third product; and
dividing said difference by said first product to obtain a further indication of said reputation of said gamer.

16. The memory of claim 13, said computer-readable memory having further computer-executable instructions for:
determining a reputation list of said gamer, wherein said reputation list comprises players with whom said gamer has completed at least one game session;
parsing said players of said reputation list into a plurality of segments;
for each segment, determining a number of players who have respectively registered an explicit decision not to play with said gamer;
for each segment, comparing a threshold value to said number of players who have respectively registered an explicit decision not to play with said gamer;
for each segment, in accordance with a result of said act of comparing, determining that said gamer has one of: harmed a respective segment and not harmed a respective segment; and
determining a ratio of harmed segments divided by a total number of segments, wherein said ratio is indicative of said reputation of said gamer.

17. The memory of claim 13, said computer-readable memory having further computer-executable instructions for forming said aggregate by:
determining a sum of said total number of strangers said gamer has encountered via game play and said total number of players who have respectively registered an explicit decision to play with said gamer;
determining a difference of said sum minus said total number of players who have respectively registered an explicit decision not to play with said gamer; and
dividing said difference by said total number of strangers said gamer has encountered via game play.

* * * * *